(12) United States Patent
Yasutomi et al.

(10) Patent No.: US 11,002,549 B2
(45) Date of Patent: May 11, 2021

(54) DATA PROCESSING DEVICE, DATA PROCESSING METHOD, AND DATA PROCESSING PROGRAM

(71) Applicant: TOPCON CORPORATION, Tokyo (JP)

(72) Inventors: Satoshi Yasutomi, Tokyo (JP); Tadayuki Ito, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 269 days.

(21) Appl. No.: 16/249,145

(22) Filed: Jan. 16, 2019

(65) Prior Publication Data

US 2019/0249989 A1 Aug. 15, 2019

(30) Foreign Application Priority Data

Feb. 13, 2018 (JP) .............................. JP2018-022750

(51) Int. Cl.
*G01C 21/20* (2006.01)
*G01C 21/00* (2006.01)

(52) U.S. Cl.
CPC .......... *G01C 21/20* (2013.01); *G01C 21/005* (2013.01)

(58) Field of Classification Search
CPC .......... B60G 17/0165; B60G 2400/821; B60G 2400/824; B60G 2401/16; B60G 2600/182; B60G 2600/1876; B60G 2800/912; G01C 7/04; G01C 21/30
See application file for complete search history.

(56) References Cited

U.S. PATENT DOCUMENTS

| 5,130,709 A * | 7/1992 | Toyama | G01C 21/28 340/990 |
| 6,233,510 B1 * | 5/2001 | Platner | B60G 13/16 382/104 |
| 10,235,817 B2 * | 3/2019 | Saeger | G01C 7/04 |
| 2009/0310143 A1 * | 12/2009 | Gardiner | E01C 23/01 356/600 |
| 2011/0112764 A1 * | 5/2011 | Trum | G01C 21/3476 701/469 |
| 2013/0103259 A1 * | 4/2013 | Eng | B60G 17/0165 701/37 |
| 2014/0355839 A1 * | 12/2014 | Bridgers | B60W 40/06 382/108 |

(Continued)

FOREIGN PATENT DOCUMENTS

JP 2017-138236 A 8/2017

*Primary Examiner* — Dung Hong
(74) *Attorney, Agent, or Firm* — Roberts Calderon Safran & Cole P.C.

(57) ABSTRACT

Provided is a data processing device including a trajectory calculating unit configured to calculate a trajectory of a mobile body that moves in a measurement section, based on measurement data acquired by the mobile body, a virtual level difference detecting unit configured to detect a virtual level difference occurring in the trajectory, a trajectory smoothing unit configured to smooth the trajectory in a section before and after the virtual level difference according to a magnitude of the virtual level difference, and a point group data generating unit configured to generate synthetic point group data by synthesizing the smoothed trajectory and point group data included in the measurement data.

3 Claims, 8 Drawing Sheets

(56) References Cited

U.S. PATENT DOCUMENTS

2016/0147915 A1\* 5/2016 Pope .................. G06F 30/13
                                                    703/1
2016/0236689 A1\* 8/2016 Pettersson ............... B60T 8/172
2017/0227955 A1\* 8/2017 Krupansky .......... G05D 1/0005

\* cited by examiner

Trajectory obtained by measurement

Point group form generated from trajectory $A_L$

Actual road surface shape
(trajectory that should originally be obtained)

Supposed original point group form

DATA PROCESSING DEVICE, DATA PROCESSING METHOD, AND DATA PROCESSING PROGRAM

TECHNICAL FIELD

The present invention relates to a data processing device, a data processing method, and a data processing program that are mainly used for an MMS (Mobile Mapping System) to execute post-processing of measurement data.

BACKGROUND ART

Conventionally, an MMS is known as a system that includes a GNSS (Global Navigation Satellite System) antenna, an IMU (Inertial Measuring Unit), a camera, and a laser scanner, etc., equipped in a mobile body such as a vehicle and acquires three-dimensional positional information of the peripheries of a road, such as building and road shapes, signs, and guardrails, etc., highly accurately and efficiently while moving (refer to Patent Literature 1, for example). Three-dimensional positional information acquired by the MMS has been used for city planning, civil engineering works, and disaster prevention planning, etc.

An MMS is a measurement system intended to execute post-processing of data. For example, when acquiring three-dimensional positional information by using the MMS disclosed in Patent Literature 1, first, while traveling in a measurement section on a target road by vehicle, the MMS acquires data on its own position based on a GNSS navigation signal (hereinafter, referred to as "satellite positioning data"), three-dimensional acceleration and angular velocity data obtained by the IMU (hereinafter, referred to as "inertial positioning data"), and measurement data at each point of scanning light by the laser scanner (hereinafter, referred to as "measurement point group data").

Next, a trajectory of the vehicle is calculated on the basis of the satellite positioning data and the inertial positioning data, and the calculated trajectory of the vehicle and the point group data are synthesized to generate three-dimensional point group data. At this time, to improve the accuracy of measurement, a round trip is made in the measurement section by the vehicle, point group data is generated for each of a forward route and a return route, and by matching these, highly accurate three-dimensional point group data is generated.

CITATION LIST

Patent Literature

[Patent Literature 1] Japanese Published Unexamined Patent Application No. 2017-138236

SUMMARY OF THE INVENTION

Technical Problem

However, as illustrated in FIG. 1A, when a vehicle 1 being a constituent of the MMS travels in the measurement section on a target road 11 to perform a measurement, a navigation signal receiving situation may change due to, for example, a change in the number or location of satellites 13 from which the signal is being received and due to the influence of multipath such as radio waves from one satellite including those to be directly received by an antenna and those to be received by an antenna after being reflected by a building 14, while the vehicle 10 stops because of a traffic signal 12, etc., or travels.

As a result, spatial discontinuity 15 such as a sudden change in height may occur in the calculated trajectory $A_L$ as illustrated in FIG. 1B (hereinafter, such data discontinuity is referred to as a "virtual level difference"). The virtual level difference 15 also occurs due to a drift, etc., caused by vibration of the vehicle.

Further, as illustrated in FIG. 1C, in synthetic point group data $A_{PG}$ that is generated by synthesizing the trajectory $A_L$ including a virtual level difference and measurement point group data acquired by the laser scanner, a local distortion 16 that is not included in supposed original point group data $B_{PG}$, illustrated in FIG. 1E, occurs. Therefore, a problem occurs in which even if synthetic point group data of the forward route and return route are matched, an accurate three-dimensional model cannot be obtained.

The present invention was made in view of the circumstances described above, and an object thereof is to realize data processing by which three-dimensional point group data with fewer errors can be obtained based on measurement data acquired by a mobile body that moves in a measurement section.

Solution to Problem

In order to achieve the above-described object, a data processing device according to an aspect of the present invention includes a trajectory calculating unit configured to calculate a trajectory of a mobile body that moves in a measurement section, based on measurement data acquired by the mobile body, a virtual level difference detecting unit configured to detect a virtual level difference occurring in the trajectory, a trajectory smoothing unit configured to smooth the trajectory in a section before and after the virtual level difference according to a magnitude of the virtual level difference, and a point group data generating unit configured to generate synthetic point group data by synthesizing the smoothed trajectory and point group data included in the measurement data.

In the aspect described above, it is also preferable that the trajectory smoothing unit is configured to set a processing section which includes the virtual level difference and to which smoothing is applied, on the trajectory according to a magnitude of the virtual level difference, and smooth the trajectory by connecting a front end and a rear end of the processing section with a straight line.

A data processing method according to another aspect of the present invention includes the steps of calculating a trajectory of a mobile body that moves in a measurement section, based on measurement data acquired by the mobile body, detecting a virtual level difference occurring in the trajectory, smoothing the trajectory in a section before and after the virtual level difference according to a magnitude of the virtual level difference, and generating synthetic point group data by synthesizing the smoothed trajectory and point group data included in the measurement data.

A program according to another aspect of the present invention is configured to make a computer execute the steps of calculating a trajectory of a mobile body that moves in a measurement section, based on measurement data acquired by the mobile body, detecting a virtual level difference occurring in the trajectory, smoothing the trajectory in a section before and after the virtual level difference according to a magnitude of the virtual level difference, and generating synthetic point group data by synthesizing the smoothed trajectory and point group data included in the measurement data.

Effect of the Invention

With the data processing device, the data processing method, and the data processing program according to the aspects of the present invention described above, even when a virtual level difference occurs in a trajectory obtained from measurement data acquired by using a mobile body that moves in a measurement section, the virtual level difference can be detected and the trajectory can be smoothed, and therefore, three-dimensional point group data with fewer errors can be obtained.

BRIEF DESCRIPTION OF THE DRAWINGS

FIG. 1A is a schematic view illustrating a state of performing a measurement using an MMS. FIG. 1B and FIG. 1C are schematic views respectively illustrating a trajectory and a point group form when a virtual level difference occurs, and FIG. 1D and FIG. 1E are schematic views respectively illustrating a trajectory and a point group form that should originally be measured.

DESCRIPTION OF EMBODIMENTS

Hereinafter, a preferred embodiment of the present invention is described with reference to the drawings, however, the invention is not limited to this.

Embodiment

Figure 1A:
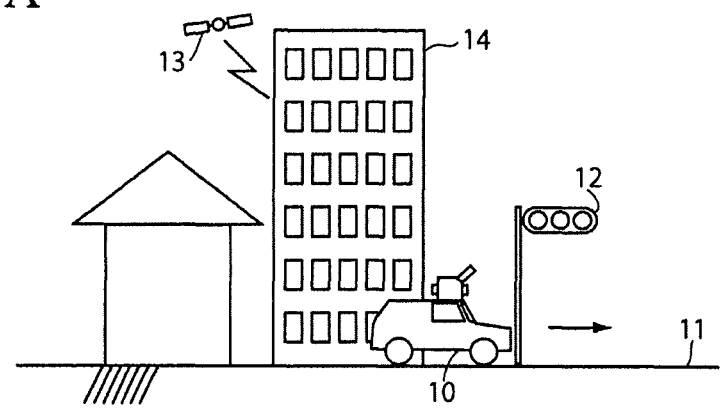
FIGS. 1A to 1E are views describing a state of the occurrence of a virtual level difference in a trajectory in a measurement using an MMS. Specifically
Figure 1B:
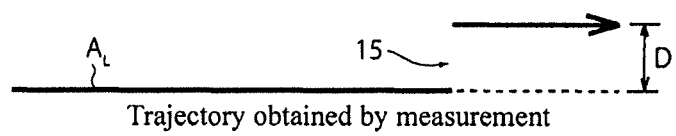
Figure 1C:
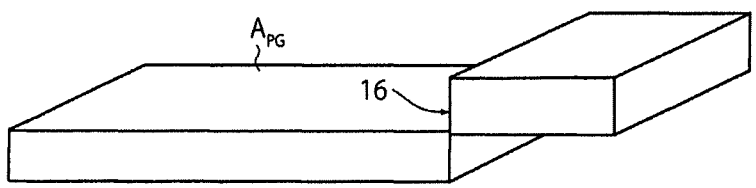
Figure 1D:
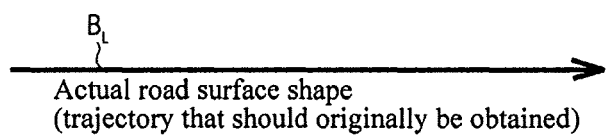
Figure 1E:
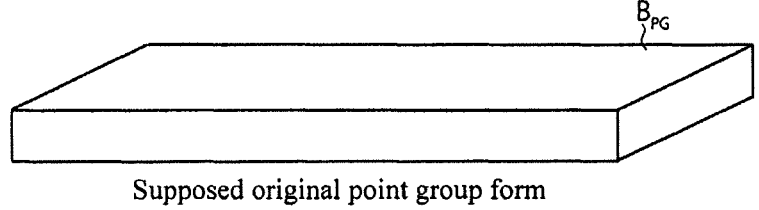
Figure 2:
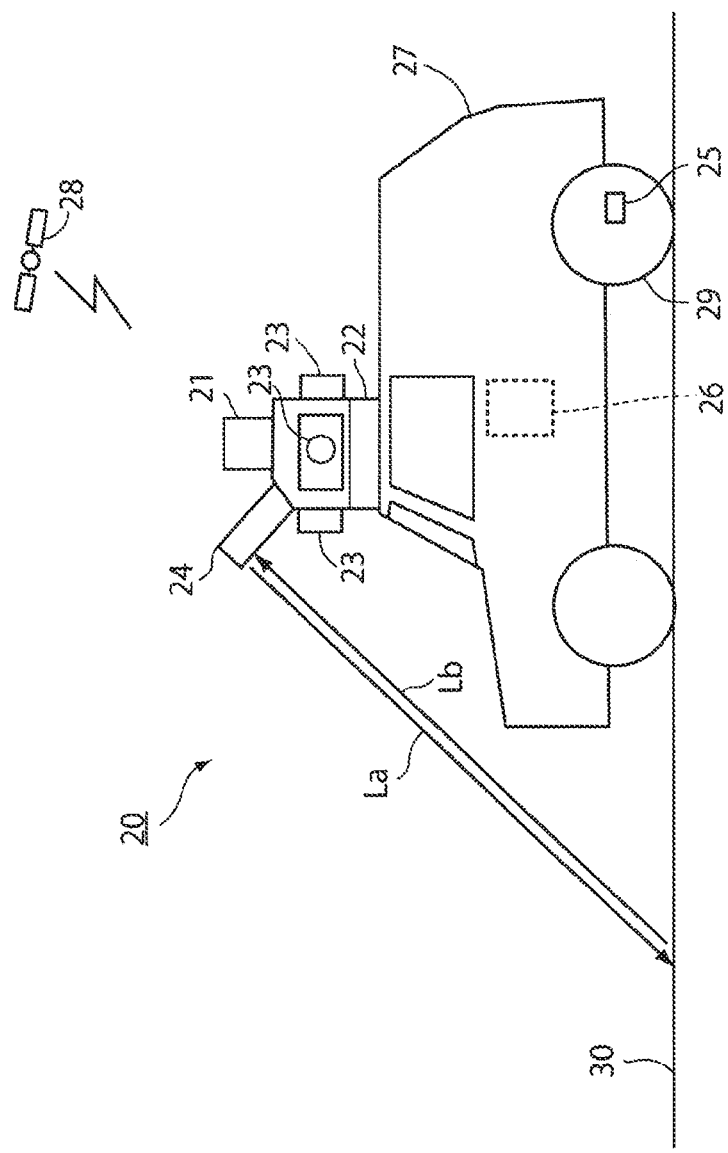
FIG. 2 is a view illustrating an outline of an MMS that measures data to be processed by a data processing device according to an embodiment of the present invention.

A data processing device according to an embodiment of the present invention is a device that mainly executes post-processing of measurement data acquired by a mobile mapping system (MMS) 20 illustrated in FIG. 2.

First, an outline of the MMS 20 is described. The MMS 20 is a measurement system configured as a mobile body equipped with an antenna 21, an IMU 22, a camera 23, a laser scanner 24, a rotary encoder 25, and a synchronization control device 26. In the MMS 20 according to the present embodiment, the mobile body consists of a vehicle 27.

The antenna 21 is a receiving device to receive a navigation signal from a navigation satellite 28 such as a GNSS satellite. Based on the navigation signal, the antenna 21 acquires satellite positioning data. The navigation signal includes, for example, a navigation signal transmission time, trajectory information of the navigation satellite 28, a phase observation value of a carrier wave, and code information to be used for measurement of a navigation signal propagation time, etc.

The IMU 22 is an inertial measuring device, includes a 3-axis gyroscope and a 3-directional accelerometer, and acquires inertial positioning data.

The camera 23 is a 360-degree camera consisting of a plurality of cameras, and shoots a video of the entire circumference ($2\pi$ space) including an upper direction. Although not described, video image data shot by the camera is used for construction of three-dimensional information of the surroundings in combination with point group data measured by the laser scanner. Exterior orientation elements (positions and postures) of the camera and the laser scanner with respect to the vehicle (in this case, a position of the IMU) are measured in advance, and such information is known.

The laser scanner 24 performs laser scanning of the entire circumference ($2\pi$ space) to acquire point group data of the surrounding environment. In detail, the laser scanner 24 spirally irradiates a scanning light La, and receives a reflected light Lb from an object such as a road 30 or a building, etc. Based on a time until this reception, by obtaining a three-dimensional position of each reflection point, point group data is acquired. The laser scanner 24 is described in, for example, Japanese Published Unexamined Patent Application No. 2008-268004, etc.

The rotary encoder 25 is attached to a wheel 29 of the vehicle 27, and acquires vehicle moving distance data from a rotation speed and a rotation angle of the wheel 29.

The synchronization control device 26 is connected via cables, etc., or wirelessly to the antenna 21, the IMU 22, the camera 23, the laser scanner 24, and the rotary encoder 25. The synchronization control device 26 synchronizes a time of inertial positioning data acquisition by the IMU 22, a time of image data acquisition by the camera 23, a time of point group data acquisition by the laser scanner 24, and a time of acquisition of moving distance data of the wheel 29 by the rotary encoder 25.

While moving along a route in a measurement section, the MMS 20 acquires satellite positioning data, inertial positioning data, measurement point group data, and moving distance data (hereinafter, these data are collectively referred to as "measurement data") by the antenna 21, the IMU 22, the camera 23, the laser scanner 24, and the rotary encoder 25, respectively.

Next, a data processing device 100 in the present embodiment is described. The data processing device 100 acquires measurement data measured by the MMS 20, and generates three-dimensional point group data of the periphery of the measurement section by using the measurement data.

The data processing device 100 is a computer. The data processing device 100 includes hardware such as a CPU (Central Processing Unit) as a processor, a RAM (Random Access Memory) as a main storage device, a ROM (Read-Only Memory) as an auxiliary storage device, and a HDD (Hard Disk Drive), etc.

The data processing device 100 is configured to be connectable to the antenna 21, the IMU 22, the camera 23, the laser scanner 24, and the rotary encoder 25 via the synchronization control device 26. The data processing device 100 may be located outside the vehicle or may be located inside the vehicle. In the present embodiment, for the sake of convenience, the data processing device 100 is assumed to be located outside the vehicle.

Figure 3:
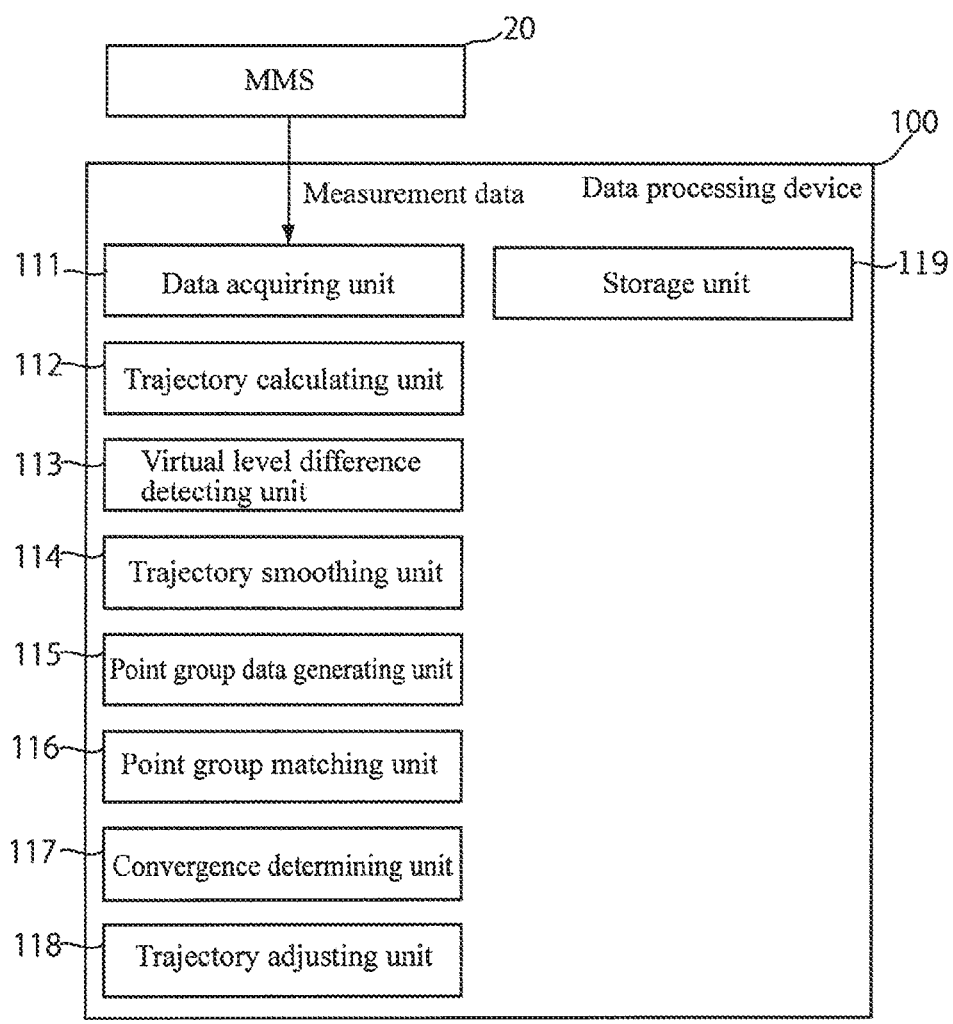
FIG. 3 is a functional configuration diagram of the data processing device according to the same embodiment.

FIG. 3 is a functional block diagram of the data processing device 100. As illustrated in FIG. 3, the data processing device 100 includes various function units including a data acquiring unit 111, a trajectory calculating unit 112, a virtual level difference detecting unit 113, a trajectory smoothing unit 114, a point group data generating unit 115, a point group matching unit 116, a convergence determining unit 117, and a trajectory adjusting unit 118, and a storage unit 119.

Each function unit may be configured by software, or may be configured by an exclusive arithmetic circuit. Alternatively, function units configured by software and function units configured by exclusive arithmetic circuits may be mixed. For example, each of the function units illustrated in the drawings is configured by a CPU (Central Processing Unit), an ASIC (Application Specific Integrated Circuit), and a PLD (Programmable Logic Device) such as an FPGA (Field Programmable Gate Array).

The data acquiring unit 111 accepts measurement data via an input interface (not illustrated). The accepted data is stored in the storage unit 119.

The input interface is a port to be connected to the synchronization control device 26. The input interface is, for example, a USB (Universal Serial Bus) terminal. Alternatively, the input interface may be a port to be connected to a LAN (Local Area Network).

The trajectory calculating unit 112 fuses satellite positioning data acquired by the antenna 21 and inertial positioning data acquired by the IMU 22, or external trajectory data including a trajectory output as a result of point group matching, etc., and inertial positioning data by using a Kalman filter, and calculates a movement trajectory of the vehicle.

The virtual level difference detecting unit 112 detects whether the trajectory includes a virtual level difference.

The trajectory smoothing unit 114 executes processing to smooth the virtual level difference in the trajectory.

The point group data generating unit 115 synthesizes the trajectory data smoothed by the trajectory smoothing unit 114 and measurement point group data at each point acquired by the laser scanner 24 to generate synthetic point group data.

The point group matching unit 116 executes processing to match the synthetic point group data generated by the point group data generating unit 115 with respect to a forward route and a return route in the same section.

The convergence determining unit 117 determines whether a virtual level difference exceeding a predetermined threshold is present (whether the virtual level difference has converged) in a trajectory corrected by the point group matching.

The trajectory adjusting unit 118 adjusts a trajectory on the basis of coordinates of characteristic points (known points that are on the route in the measurement section and are distinguishable from the surroundings such as utility poles, trees, and buildings, etc.).

The storage unit 119 stores measurement data and data calculated in each function unit. The storage unit 119 is realized by a main storage device and an auxiliary storage device, but may be realized only by a main storage device or only by an auxiliary storage device.

Programs to implement the functions of the respective function units may be stored in a storage medium such as a magnetic disc, a flexible disc, an optical disc, a compact disc, a Blu-ray (registered trademark) disc, a DVD, or the like.

(Operation of Data Processing Device)

Figure 4:
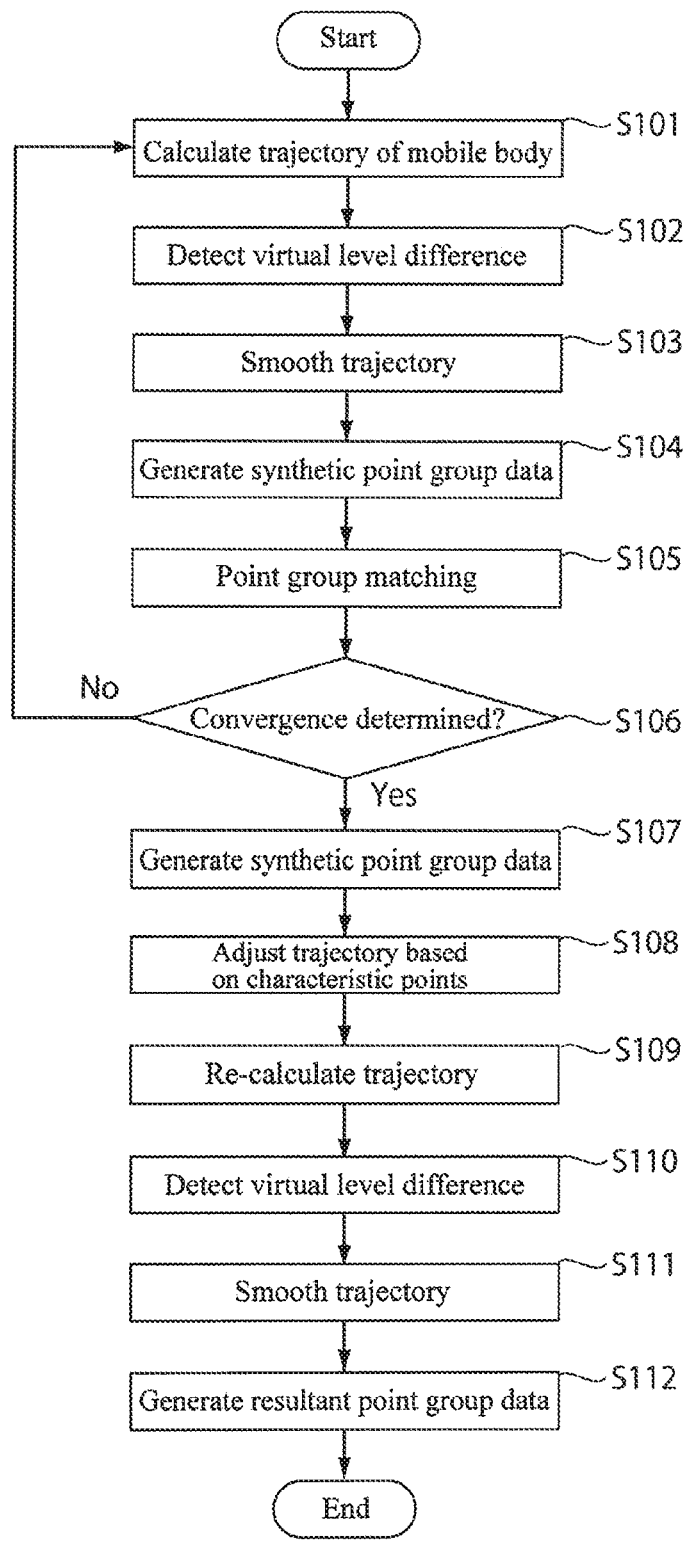
FIG. 4 is a flowchart illustrating operation of the data processing device according to the same embodiment.

Next, a data processing method to be performed by the data processing device 100, and data processing according to a data processing program to make a computer execute the data processing method, are described with reference to FIG. 4.

When the processing starts, in Step S101, the trajectory calculating unit 112 performs data fusion by using a Kalman filter on the basis of satellite positioning data acquired by the antenna 21 and inertial positioning data acquired by the IMU 22, and calculates a movement trajectory of the vehicle.

Next, in Step S102, the virtual level difference detecting unit 113 detects a virtual level difference in the calculated movement trajectory. Details of the virtual level difference detection processing are described later.

Next, in Step S103, the trajectory smoothing unit 114 performs smoothing of the virtual level difference in the movement trajectory. Details of the smoothing are described later.

Next, in Step S104, the point group data generating unit 115 synthesizes the smoothed vehicle trajectory and measurement point group data acquired by the laser scanner 24 to generate synthetic point group data. The synthetic point group data is generated for each of the forward route and return route in the measurement section.

Next, in Step S105, the point group matching unit 116 matches the synthetic point group data of the forward route side and the synthetic point group data of the and return route side.

Next, in Step S106, the convergence determining unit 117 calculates a corrected trajectory from the point group matching results obtained in Step S105, and determines in all virtual level differences detected in Step S102 whether magnitudes D of the virtual level differences are equal to or less than a predetermined threshold $Th_1$.

When the magnitudes D of the virtual level differences are not equal to or less than the predetermined threshold $Th_1$ (No), the processing returns to Step S101, and based on the corrected trajectory and the inertial positioning data acquired by the IMU, the processing of Steps S101 to S106 are repeated until the magnitudes D of the virtual level differences become equal to or less than the predetermined threshold $Th_1$.

When the magnitudes D of the virtual level differences are equal to or less than the predetermined threshold $Th_1$ (Yes), the processing shifts to Step S107, and the point group data generating unit 115 synthesizes the corrected trajectory obtained in Step S106 and the measurement point group data acquired by the laser scanner 24 to generate synthetic point group data.

Next, in Step S108, the trajectory adjusting unit 118 adjusts a trajectory obtained from the synthetic point group data on the basis of the coordinates of the characteristic points.

Next, in Step S109, the trajectory calculating unit 112 performs data fusion by using a Kalman filter on the basis of the trajectory adjusted in Step S108 and the inertial positioning data acquired by the IMU, and re-calculates a trajectory.

Next, in Step S110, virtual level difference detection in the trajectory re-calculated in Step S109 is performed in the same manner as in Step S102.

Next, in Step S111, the trajectory smoothing unit 114 performs smoothing of the trajectory re-calculated in Step S109, in the same manner as in Step S103. The smoothing is applied to all virtual level differences detected in Step S110.

Next, in Step S112, the point group data generating unit 115 synthesizes the trajectory smoothed in Step S111 and the measurement point group data acquired by the laser scanner 24 to generate resultant three-dimensional point group data, and the processing ends.

Figure 5:
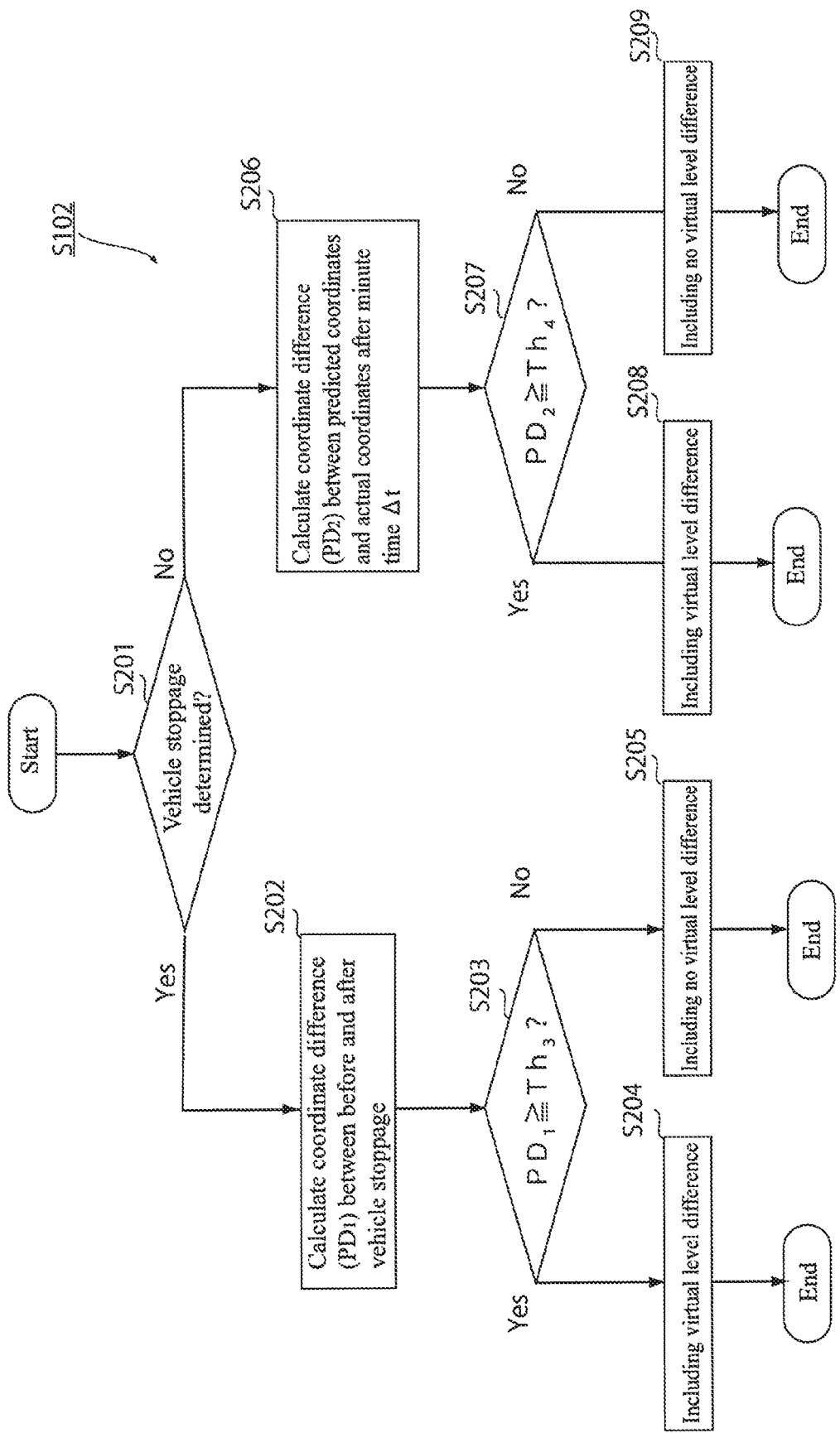
FIG. 5 is a flowchart illustrating a virtual level difference detecting operation in the data processing device according to the same embodiment.
Figure 6A:
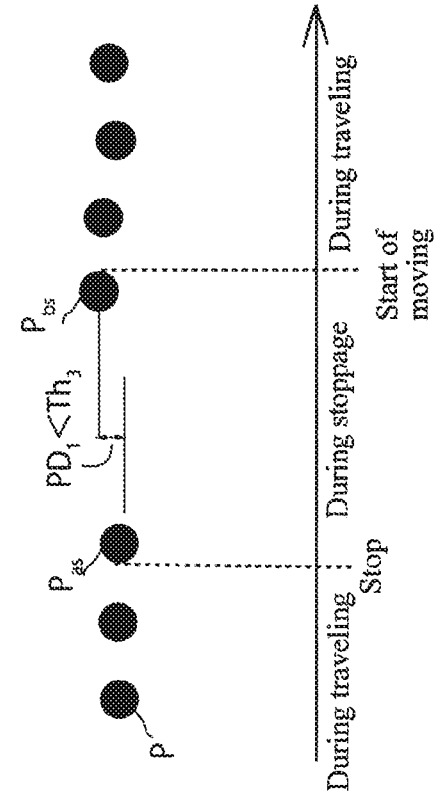
FIGS. 6A and 6B are diagrams describing a method of detecting a virtual level difference during stoppage of a vehicle, in the data processing device according to the same embodiment.
Figure 6B:
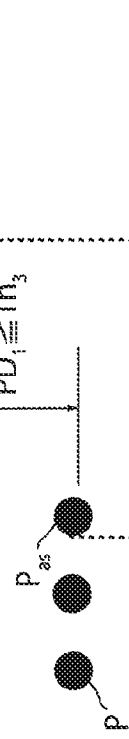
Figure 7A:
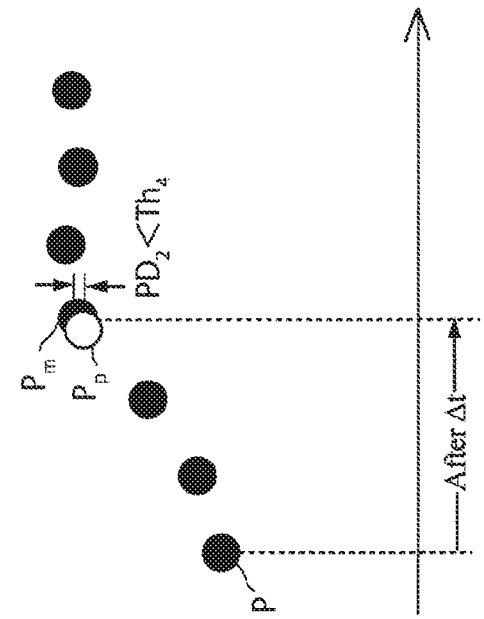
FIGS. 7A and 7B are diagrams describing a method of detecting a virtual level difference during traveling of a vehicle, in the data processing device according to the same embodiment.
Figure 7B:
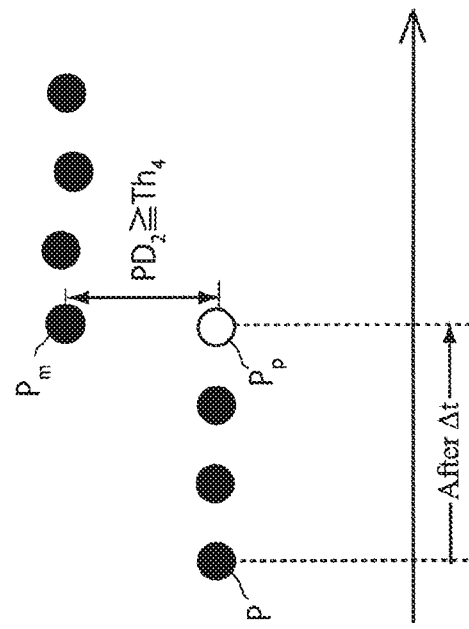

Here, details of the virtual level difference detection in Step S102 are described with reference to FIG. 5 to FIGS. 7A, 7B. FIG. 5 is a flowchart of virtual level difference detection processing. FIGS. 6A, 6B are diagrams describing a method of detecting a virtual level difference during stoppage of the vehicle, and FIGS. 7A, 7B are diagrams describing a method of detecting a virtual level difference during traveling of the vehicle.

When the processing of Step S102 starts, first, in Step S201, the virtual level difference detecting unit 113 judges whether the vehicle 27 is stopped at each position. The judgment as to whether the vehicle 27 is stopped is performed by judging whether a vehicle speed obtained by moving distance data obtained from the rotary encoder 25 is smaller than a predetermined threshold $Th_2$.

In Step S201, when the vehicle 27 is judged to be stopped (Yes), the processing shifts to Step S202, and a difference between coordinates of a position $P_{as}$ just after the stoppage of the vehicle and coordinates of a position $P_{bs}$ just before starting to move during stoppage of the vehicle, identified in Step S201, that is, a coordinate difference $PD_1$ between before and after vehicle stoppage is obtained (refer to FIGS. 6A, 6B).

Next, in Step S203, whether the coordinate difference $PD_1$ between before and after the vehicle stoppage obtained in Step S202 is equal to or more than a predetermined threshold $Th_3$ is judged.

In Step S203, as illustrated in FIG. 6A, when the difference $PD_1$ between the coordinates of the position $P_{as}$ just after the stoppage of the vehicle and the coordinates of the position $P_{bs}$ just before starting to move is equal to or more than the threshold $Th_3$ (Yes), the processing shifts to Step S204, and the virtual level difference detecting unit 113 judges that the movement trajectory calculated in Step S101 includes a virtual level difference, and ends the processing.

In Step S203, as illustrated in FIG. 6B, when the difference $PD_1$ between the coordinates of the position $P_{as}$ just after the stoppage of the vehicle and the coordinates of the position $P_{bs}$ just before starting to move is smaller than the threshold $Th_3$ (No), the processing shifts to Step S205, and the virtual level difference detecting unit 113 judges that the movement trajectory calculated in Step S101 includes no virtual level difference, and ends the processing.

On the other hand, in Step S201, when it is judged that the vehicle 27 is not stopped at a certain position P (No), the processing shifts to Step S206, and the virtual level difference detecting unit 113 assumes that the vehicle 27 makes uniform motion at that position and predicts coordinates of a position $P_p$ of the vehicle 27 a minute time Δt after the time of the position P (refer to FIGS. 7A, 7B). In FIGS. 7A and 7B, black circles show coordinates of a trajectory calculated based on measurement data, and white circles show coordinates obtained by prediction.

Next, the processing shifts to Step S207, and the predicted coordinates of the position $P_p$ of the vehicle 27 after the minute time Δt are compared with coordinates of a position $P_m$ of the vehicle 27 after the minute time Δt obtained based on the measurement data, and whether a difference $PD_2$ between these coordinates is equal to or more than a predetermined threshold $Th_4$ is judged.

In Step S207, as illustrated in FIG. 7A, when the difference between the predicted coordinates of the position $P_p$ of the vehicle 27 after the minute time Δt and the coordinates of the position $P_m$ of the vehicle 27 after the minute time Δt obtained based on the measurement data is equal to or more than the threshold $Th_4$ (Yes), the processing shifts to Step S208, and the virtual level difference detecting unit 113 judges that the movement trajectory calculated in Step S101 includes a virtual level difference, and ends the processing.

In Step S207, as illustrated in FIG. 7B, when the difference $PD_2$ between the predicted coordinates of the position $P_p$ of the vehicle 27 after the minute time Δt and the coordinates of the position $P_m$ of the vehicle 27 after the minute time Δt obtained based on the measurement data is smaller than the threshold $Th_4$ (No), the processing shifts to Step S209, and the virtual level difference detecting unit 113 judges that the movement trajectory calculated in Step S101 includes no virtual level difference D, and ends the processing.

The processings of Steps S202 to S205 are executed for all of the positions at which the vehicle is judged to be stopped in Step S201. The processings of Steps S206 to S209 are executed for all of the positions at which the vehicle is judged to be traveling in Step S201.

Figure 8:
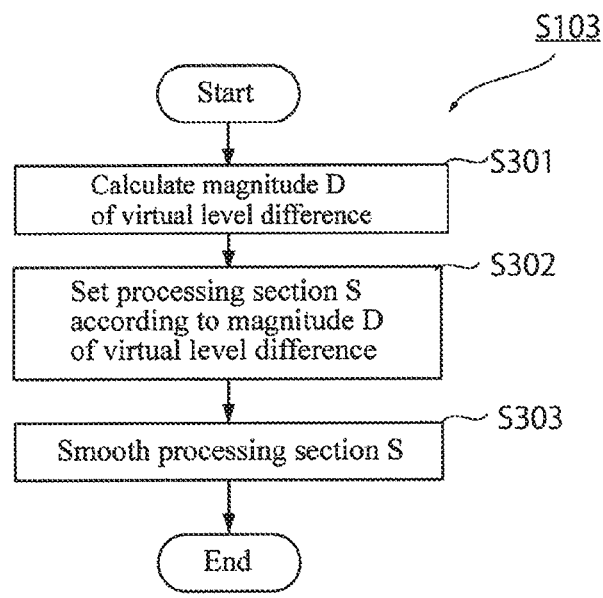
FIG. 8 is a flowchart illustrating a trajectory smoothing operation in the data processing device according to the same embodiment.
Figure 9A:
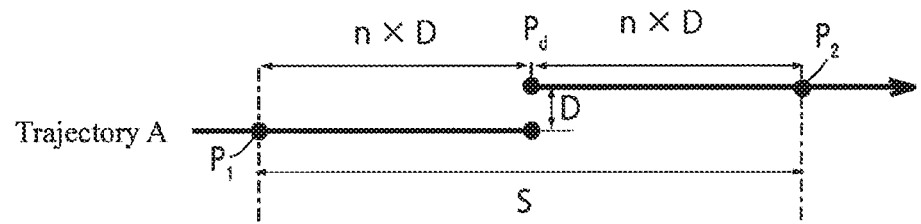
FIGS. 9A and 9B are diagrams describing a method of trajectory smoothing according to the same embodiment.
Figure 9B:
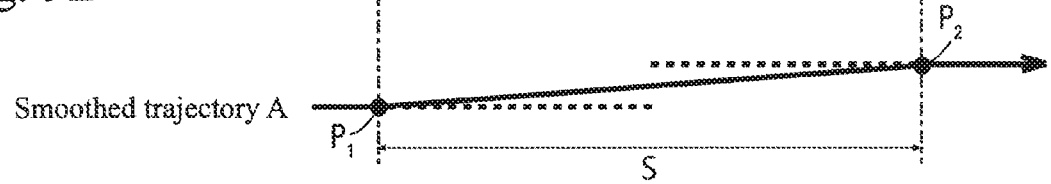

Here, details of the trajectory smoothing in Step S103 are described with reference to FIG. 8 and FIGS. 9A, 9B. FIG. 8 is a flowchart of trajectory smoothing. FIGS. 9A, 9B are diagrams that schematically represent trajectories before smoothing (FIG. 9A) and after smoothing (FIG. 9B).

When the processing of Step S103 starts, first, in Step S301, the trajectory smoothing unit 114 calculates a magnitude D of the virtual level difference detected in Step S102.

Next, in Step S302, the trajectory smoothing unit 114 sets a predetermined section before and after the level difference on the trajectory as a processing section S according to the magnitude D of the virtual level difference. As the processing section S, for example, as illustrated in FIG. 9A, a section of ±n×D before and after the position PD of the virtual level difference is set. Here, n is, for example, an arbitrary natural number, and n falls preferably within the range of 8 to 22 because the trajectory is sufficiently smoothed, and more preferably, n falls within the range of 10 to 20. The reason for this is that, if the processing section S is excessively narrow, smoothing is insufficient the trajectory is not sufficiently smoothed, and matching with an original form is difficult, and if the processing section S is excessively wide, smoothing may conversely give errors to an accurate trajectory with fewer errors that does not originally need to be smoothed.

Next, in Step S203, the range of the processing section S is smoothed, and the processing is ended. The trajectory smoothing is performed by, as illustrated in FIG. 9B, a method such as connecting coordinates of a front end $P_1$ and coordinates of a rear end $P_2$ of the processing section S with a straight line.

In Step S102, when N virtual level differences are detected in the movement trajectory of the vehicle, the above-described trajectory smoothing is executed for each of the N virtual level differences.

With the configuration described above, even when a discontinuity occurs in a movement trajectory of the vehicle obtained based on measurement data of the MMS 20, by accurately detecting the discontinuity and locally smoothing the part of discontinuity, resultant three-dimensional point group data with fewer errors can be obtained.

A preferred embodiment of the present invention is described above, and the working examples described above are just examples of the present invention, and can be combined based on knowledge of a person skilled in the art, and such a combined mode is also included in the scope of the present invention.

REFERENCE SIGNS LIST

27 Mobile body (vehicle)
100 Data processing device
112 Trajectory calculating unit
113 Virtual level difference detecting unit
114 Trajectory smoothing unit
115 Point group data generating unit

What is claimed is:

1. A data processing device comprising:
   a trajectory calculating unit configured to calculate a trajectory of a mobile body that moves in a measurement section, based on measurement data including satellite positioning data received by the mobile body and inertial positioning data acquired by the mobile body;
   a virtual level difference detecting unit configured to detect an erroneous, virtual level difference occurring in the calculated trajectory as a result of a discontinuity or signal error in the satellite positioning data received by the mobile body;
   a trajectory smoothing unit configured to smooth the trajectory in a section before and after the virtual level difference upon the detection of a predetermined magnitude of the virtual level difference; and
   a point group data generating unit configured to generate synthetic point group data by synthesizing the smoothed trajectory and point group data included in the measurement data.

2. The data processing device according to claim 1, wherein the trajectory smoothing unit is configured to set a processing section which includes the virtual level difference and to which smoothing is applied, on the trajectory according to a magnitude of the virtual level difference, and smooth the trajectory by connecting a front end and a rear end of the processing section with a straight line.

3. A data processing method comprising the steps of:
   calculating a trajectory of a mobile body that moves in a measurement section, based on measurement data including satellite positioning data received by the mobile body and inertial positioning data acquired by the mobile body;
   detecting an erroneous, virtual level difference occurring in the calculated trajectory as a result of a discontinuity or signal error in the satellite positioning data received by the mobile body;
   smoothing the trajectory in a section before and after the virtual level difference upon the detection of a predetermined magnitude of the virtual level difference; and
   generating synthetic point group data by synthesizing the smoothed trajectory and point group data included in the measurement data.

\* \* \* \* \*